May 17, 1960 W. A. NIELSEN 2,936,607

LOCK APPARATUS

Filed June 19, 1957 2 Sheets-Sheet 1

Inventor:
Watrous A. Nielsen
By: Leonard S. Knox
Atty.

Inventor.
Watrous A. Nielsen.
By: Leonard S. Knox
Atty.

United States Patent Office 2,936,607
Patented May 17, 1960

2,936,607

LOCK APPARATUS

Watrous A. Nielsen, Chicago, Ill.

Application June 19, 1957, Serial No. 666,534

1 Claim. (Cl. 70—277)

This invention relates to lock apparatus, for example, locks for entrance doors, vaults and the like. In particular it has reference to an organization arranged so that unlocking is capable of being performed by a specific individual or individuals without the use of a key, although the invention apparatus may, if desired, be supplemented by a key or other mechanical operating device.

The invention relies on the well-known anatomical fact that no two individuals possess identical fingerprints and that therefore a lock under control of a selected individual's fingerprint is incapable of being operated by another individual.

Accordingly, a principal object of this invention is the provision of lock apparatus control for at least the unlocking operation by an individual fingerprint.

Another object is to provide lock apparatus as aforesaid which may, by some modification be capable of operation by more than one qualified individual.

Other objects and advantages will become apparent from the ensuing description which, taken with the accompanying drawing, illustrate certain preferred embodiments of the invention.

Broadly regarded, the invention in one aspect comprises an electro-optical reading of the individual fingerprint, the translation of the reading into a usable electrical signal and the amplification and utilization of the signal to operate the locking mechanism proper or to condition the mechanism for operation either manually or mechanically. The apparatus thus constituted may be arranged for operation by a plurality of a qualified individuals, although only one at any given time, by re-setting a portion of the apparatus from time to time as required. However, by means of a selector switch, multiple operation may be accomplished without physical alteration of the apparatus. The individual fingerprint or fingerprints may be of any one of the fingers although a thumb is deemed most convenient and the impression thereof is prepared in situ at the time the apparatus is to be actuated.

In another aspect the invention may function by comparing an authorized fingerprint stored in the apparatus with a fingerprint made in situ. Such comparison may be made by a suitable electronic device capable of scanning the instantaneous fingerprint and comparing the scanning voltage pattern with that of the stored fingerprint. If the comparison yields identity when the locked mechanism is conditioned for manual or mechanical operation or may be directly actuated by electrical means initiated by the comparer. Alternatively the two fingerprints may be compared quantitatively by a battery of photocells. The illumination impinging on the photocells is interrupted by a print made in situ thus yielding an output voltage of some specified value, and the lock mechanism is adjusted for actuation at this voltage. Thereafter the print is removed and destroyed. Subsequent operation of the locking mechanism is enabled only when the identical print is interposed between the source of illumination and the group of photocells.

Figure 1:
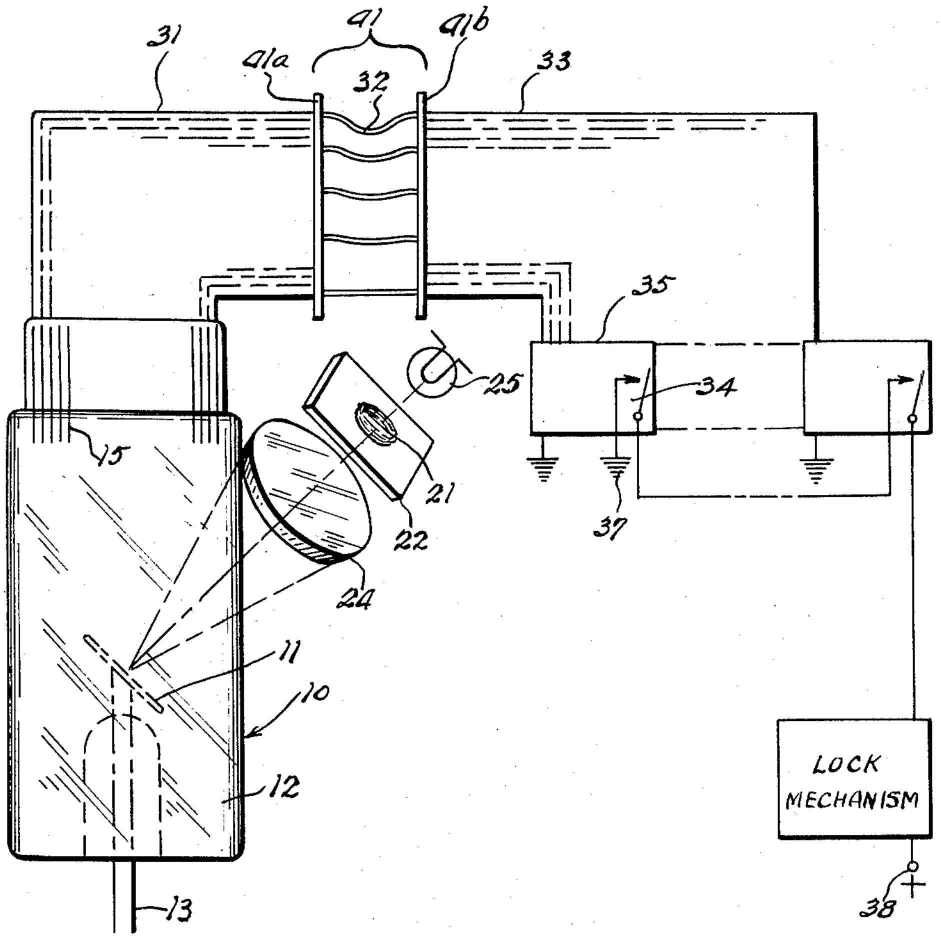
Fig. 1 is a somewhat schematic diagram showing one form of the invention.

Turning now to the drawings I have shown (Fig. 1) an arrangement comprising a phototube 10 having an inclined photoelectric cathode 11 mounted within the envelope 12 thereof and arranged to be supplied with negative polarity at a lead 13. A plurality of closely spaced anodes 15 are located at the end of the envelope opposite the cathode and correspond to a bank of positive terminals adapted to carry the beam current of the cathode. The potential of each anode will be variable depending upon the proportional beam current impinging thereon and this in turn will depend on the emission pattern of the cathode. Thus when illumination impinging on the cathode is uniformly distributed thereover the potential of all anodes will be equal, but when the emission is caused to vary with the contrasting values of a variable source of illumination the anode potentials will be varied proportionately. A phototube of character suitable for use with the organization of Fig. 1 is disclosed in U.S. Letters Patent No. 2,516,784.

The person authorized to operate the lock will impress his fingerprint 21 on a flat plate of transparent material 22 which is then interposed in a suitable guide (not shown) between a lens 24 and a light source 25. To insure proper location of the print relative to the cathode the print will be impressed in a fixed outline carried on the plate 22 and the guide will have a predetermined location relative to the cathode. Thus upon interposition of the fingerprint corresponding excitation of the active cathode surface will occur and consequent impression on the multiple anodes of a potential pattern corresponding to the individual print. Obviously, resolution is increased by the use of the magnifying lens 24 or a suitable combination of magnifying lenses.

Each anode is connected through individual conductors 31, 32 and 33 to a bank of relays 34 actuated by electronic amplifiers 35 whereby a predetermined potential applied to a relay will close the contacts thereof. The plurality of contact pairs are connected in series between a source of supply of current indicated as negative ground at 37 and positive polarity at 38. Thus, when all of the relay pairs close the lock mechanism may be electrically actuated, as by a solenoid under the control of the relays.

The number of anodes and relays required will depend upon the resolution necessary to distinguish between the authorized print and an unauthorized print.

In order to reset the apparatus when authorization is changed from one person to another a patch board 41 may be utilized. Thus, the conductors 32 represent a plurality of patch cords having plugs for engagement in individual jacks carried in the board *41a*, the several cords being individual continuations of the conductors 33 at the junction board *41b*. With this arrangement a new setting corresponding with a replacement fingerprint may be expeditiously effected. If desired the patch board 41 may be any suitable selector switch permitting rapid change from one authorized print to another. Obviously, the patch board or switch, as the case may be, will be separately locked in an enclosure or by other means to insure that any change is accomplished only by a qualified person.

It will be understood that, following operation of the lock the impression 21 is erased.

Figures 2, 3, 4, 5:
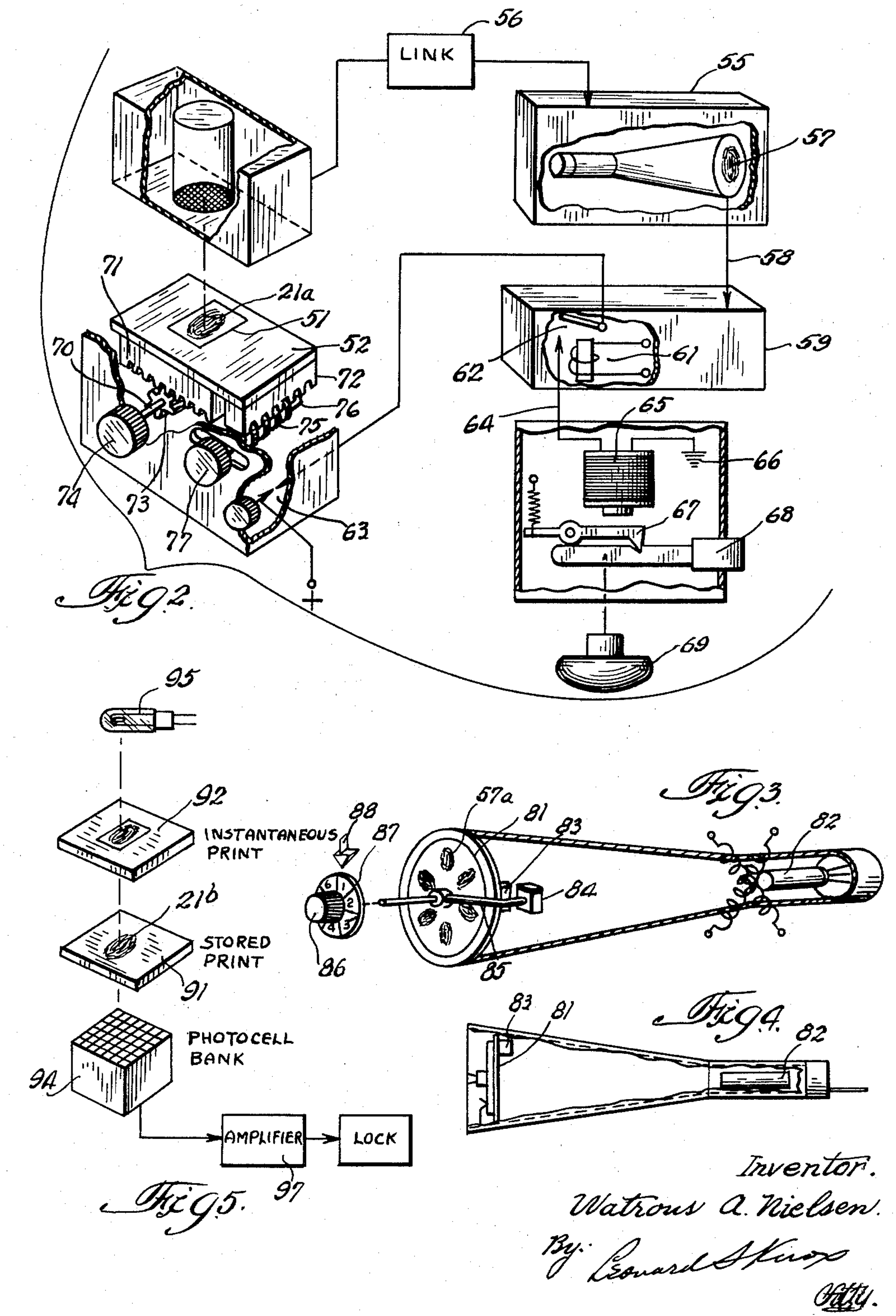
Fig. 2 is a similar diagram of a modified form of the invention.
Figs. 3 and 4 show another modified form of the invention.
Fig. 5 shows a still further modified form.

A modified form of the invention is illustrated in Fig. 2.

In this embodiment the qualified operator impresses a fingerprint $21a$ within the confines of a fixed outline 51 on an acceptable surface of the plate 52. In the present case the plate 52 need not be transparent although, for purposes of the arrangement being described, some incident illumination may be required. Positioned to respond to the print is an electronic image tube of any known type, e.g. an image orthicon wherein the fingerprint is impressed on a mosaic and scanned at a uniform rate on two orthogonal axes. The impulses thus resulting are transferred to a comparing device 55 through any suitable link 56. A master or stored print 57 corresponding to the instantaneous print $21a$ is thus compared with the transmitted image. For this purpose any known comparing means may be used, e.g. a cathode ray tube having a flying spot modulated by the signal from the image tube. When the image is found to be electronically in correspondence with the stored print the device 55 provides a signal which is fed over a conductor 58 to an amplifier 59 which then delivers its output to a relay 61; the contacts 62 whereof close. At this moment a switch 63 has been closed by the operator to complete a circuit from positive polarity, over contacts 62, conductor 64, solenoid 65 to ground at 66. The spring-biased latch 67 or other locking means is withdrawn from the bolt 68 which can then be actuated by a knob 69 or equivalent means. Switch 63 is not essential. However, it prevents operation of the relay by spurious pulses.

In any of the embodiments of the invention disclosed herein it may be desirable to accommodate for any minor mislocation of the fingerprint with respect to the outline 51. One mode of effecting precise location is shown in Fig. 2 in which the plate 52 is provided with racks 71 and 72. Rack 71 is in mesh with a pinion 73 carried on a shaft 70 bearing a knob 74 and whereby lateral adjustment of the plate 52 may be effected. Rack 72 is in mesh with a worm 75 carried on a shaft 76 bearing a knob 77 and whereby fore and aft adjustment may be effected. Shaft 76 is mounted in bearings (not shown) on the plate 62 in order that proper mesh of the rack 72 and worm 75 may be maintained regardless of the lateral position of the plate.

A further alternative form of the invention is shown in Figs. 3 and 4 and is to be considered in connection with the embodiment of Fig. 2. It will have been noted that the comparing device 55 utilizes a single stored print 37. However, if it is required that lock actuation be permitted by more than one individual several prints $57a$ may be carried on a rotatable disc 81 within the tube and the scanning means 82 so arranged as to scan only one print at a time. Selection of a particular print is preferably accomplished by mounting a magnetic piece 83 on the disc and a rotatable permanent magnet 84 closely adjacent thereto exteriorly of the tube. Magnet 84 is carried on an arm 85 which is arranged to be rotated by a selector knob 86. By this means rotation of the knob 86 is effective to rotate a selected print $57a$ into active (i.e. scanning) position. An exterior detent of any known form may be employed to insure accurate, repeated positioning of the selected print. A disc 87 bearing indicia representative of the several selectible prints is desirably mounted for rotation with the knob and cooperates with an index 88. The knob 86 will be located exteriorly of the locked space e.g. adjacent the knobs 74 and 77, and the proper selection made by the operator.

In Fig. 5 I have shown another modification adapted to compare a stored or master print with the instantaneous print. Some of the details resemble those heretofore described, namely, a plate 91 carrying the master print $21b$ and a plate 92 upon which the authorized operator may impress the instantaneous print. Plates 91 and 92 are transparent. A bank of photoelectric cells 94 is positioned following the plate 91 and a light source 95 is located in advance of the plate 92. Accordingly, if the two prints are in correspondence the illumination reaching the cells 94 will yield some value of output which will have been predetermined by initial comparison of the master print and the instantaneous print and the lock may then be adjusted to operate at that value. Thereafter lack of the same correspondence between the two prints will thwart actuation of the lock mechanism. The necessary degree of resolution to enable effective comparison of the two prints may be obtained by the use of a sufficient number of photocells. These latter will be connected in a manner designed to provide maximum output when the prints correspond. Any lower value will be insufficient to operate the lock mechanism. When necessary an amplifier 97 may be used to increase the output of the photocells to a level capable of operating the solenoid or other device employed to release the lock mechanism.

While I have shown certain embodiments of my invention, it will be understood, of course, that I do not wish to be limited thereto since many modifications may be made and I therefore contemplate by the appended claim to cover any such modifications as fall within the true spirit and scope of my invention.

I claim:

Lock apparatus for operation only by a qualified individual comprising: a lock, electromechanical means for actuating said lock, a transparent member having a surface adapted to receive an impression of the individual's fingerprint, the whorls and loops of said fingerprint and the spaces therebetween being delineated and distinguished substantially opaquely and transparently for contrast, means for transilluminating said fingerprint, photo-electric means for scanning of said fingerprint in elemental areas of the whole to provide a variable voltage output proportional to the light transmitted by the elements being scanned, and circuit means for integrating the variable voltage output into a composite voltage for energizing said electromechanical means.

References Cited in the file of this patent

UNITED STATES PATENTS 2,010,543 Gray ................ Aug. 6, 1935

FOREIGN PATENTS 998,272 France ................ Sept. 19, 1951